(12) United States Patent
Spicer et al.

(10) Patent No.: US 10,954,681 B2
(45) Date of Patent: Mar. 23, 2021

(54) COVER FOR A SPA AND METHOD OF FABRICATING A COVER FOR A SPA

(71) Applicant: STRONG INDUSTRIES, INC., Northumberland, PA (US)

(72) Inventors: Wade Spicer, Northumberland, PA (US); Charles Woods, Northumberland, PA (US)

(73) Assignee: STRONG INDUSTRIES, INC., Northumberland, PA (US)

( * ) Notice: Subject to any disclaimer, the term of this patent is extended or adjusted under 35 U.S.C. 154(b) by 0 days.

(21) Appl. No.: 16/276,927

(22) Filed: Feb. 15, 2019

(65) Prior Publication Data

US 2020/0024859 A1 Jan. 23, 2020

Related U.S. Application Data

(60) Provisional application No. 62/630,887, filed on Feb. 15, 2018.

(51) Int. Cl.
| | |
|---|---|
| *E04H 4/08* | (2006.01) |
| *B29C 51/10* | (2006.01) |
| *B29C 51/14* | (2006.01) |
| *B32B 5/18* | (2006.01) |
| *B32B 7/06* | (2019.01) |
| *B32B 7/12* | (2006.01) |

(Continued)

(52) U.S. Cl.
CPC .............. *E04H 4/08* (2013.01); *B29C 51/10* (2013.01); *B29C 51/14* (2013.01); *B32B 5/18* (2013.01); *B32B 7/06* (2013.01); *B32B 7/12* (2013.01); *B32B 27/065* (2013.01); *B32B 27/08* (2013.01); *B32B 27/20* (2013.01); *B32B 27/302* (2013.01); *B32B 27/304* (2013.01); *B32B 27/308* (2013.01); *B32B 37/02* (2013.01); *B32B 37/12* (2013.01); *B32B 37/185* (2013.01); *B29K 2627/06* (2013.01); *B29K 2655/02* (2013.01); *B29K 2995/002* (2013.01); *B32B 2266/08* (2013.01); *B32B 2305/022* (2013.01); *B32B 2307/4026* (2013.01); *B32B 2307/71* (2013.01); *B32B 2325/00* (2013.01); *B32B 2327/06* (2013.01); *B32B 2333/04* (2013.01); *B32B 2435/00* (2013.01)

(58) Field of Classification Search
CPC ....................................................... E04H 4/08
USPC ................. 4/498, 494–496; 135/87; 220/216
See application file for complete search history.

(56) References Cited

U.S. PATENT DOCUMENTS

| | | |
|---|---|---|
| 4,660,545 A | 4/1987 | Ely |
| 5,398,350 A | 3/1995 | Watkins et al. |

(Continued)

FOREIGN PATENT DOCUMENTS

| | | |
|---|---|---|
| WO | 2012131328 | 10/2012 |
| WO | 2016159119 | 10/2016 |

OTHER PUBLICATIONS

International Search Report dated Apr. 22, 2019 Based on International Application No. PCT/US2019/018243.

(Continued)

*Primary Examiner* — Lori L Baker
(74) *Attorney, Agent, or Firm* — Grogan, Tuccillo & Vanderleeden, LLP

(57) ABSTRACT

A method of manufacturing an article for a spa includes laminating a cosmetic film to a base substrate; laminating an acrylic film to the cosmetic film, the base substrate, cosmetic film and the acrylic film forming a layered assembly, and forming the layered assembly to shape.

20 Claims, 15 Drawing Sheets

(51) Int. Cl.
*B32B 27/06* (2006.01)
*B32B 27/08* (2006.01)
*B32B 27/20* (2006.01)
*B32B 27/30* (2006.01)
*B32B 37/02* (2006.01)
*B32B 37/12* (2006.01)
*B32B 37/18* (2006.01)
*B29K 627/06* (2006.01)
*B29K 655/02* (2006.01)

(56) References Cited

U.S. PATENT DOCUMENTS

| | | |
|---|---|---|
| 5,720,407 A | 2/1998 | Hoffman |
| 5,895,624 A | 4/1999 | Reece et al. |
| 6,112,340 A | 9/2000 | Ziebert et al. |
| 2014/0287204 A1 | 9/2014 | Rummens et al. |
| 2017/0144361 A1 | 5/2017 | Hills et al. |
| 2017/0260765 A1 | 9/2017 | Spicer et al. |

OTHER PUBLICATIONS

International Search Report dated May 23, 2017 Based on International Application No. PCT/US17/20857.

COVER FOR A SPA AND METHOD OF FABRICATING A COVER FOR A SPA

CROSS-REFERENCE TO RELATED APPLICATIONS

This application claims the benefit of U.S. Provisional Application Ser. No. 62/630,887, filed on Feb. 15, 2018, which is hereby incorporated by reference herein in its entirety.

FIELD OF THE INVENTION

The present invention relates generally to spas and, more particularly, to a cover for a spa and related method of fabricating a cover for a spa or hot tub.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage-like effect.

Because many spas/hot tubs are located outdoors, they are often equipped with covers for enclosing the tub when not in use. These covers help prevent dirt, leaves and other debris from entering the water, and provide a safety function by preventing children and animals from falling into the water. Moreover, spa covers are often insulated so as to limit heat loss from the water when the spa is not in use for purposes of energy efficiency and readiness of use.

Both soft and hard covers are known in the art. Typical hard covers generally consist of a hollow plastic shell that can be filled with an insulating foam. These covers typically include internal ribs or columns (also referred to as "kiss offs") that extend between the top shell member and the bottom shell member of the cover to provide structural rigidity and support to the cover. These kiss-offs, while providing rigidity, can degrade the overall insulative benefits of the cover by providing a conductive means for heat to escape the spa to atmosphere.

In connection with the above, typical hard covers for spas may be formed using a variety of molding methods, such as through rotational molding and blow molding. These molding methods, however, require very expensive, custom molds, meaning if a new size or shape cover is desired, a new mold is necessary. Accordingly, this expense has hindered the widespread adoption of hard covers across the spa industry, particularly in view of the sheer number of different sized and shaped spas produced among numerous manufacturers. In addition, existing molding methods do not allow for much variation in the color of the covers produced.

In view of the above, there remains a need for a cover for a spa that has improved insulative properties and structural integrity, and a related method for producing a cover of any size and shape at a reduced cost.

SUMMARY OF THE INVENTION

It is an object of the present invention to provide a cover for a spa and related method of fabricating a cover for a spa.

It is another object of the present invention to provide a method of fabricating a cover for a spa that has better insulative properties than existing covers.

It is another object of the present invention to provide a cover for a spa that obviates the need to utilized "kiss-offs" that connect the top and bottom sides of the cover.

It is another object of the present invention to provide a method of fabricating a cover for a spa that has improved strength and rigidity as compared to existing covers.

It is another object of the present invention to provide a method of fabricating a cover for a spa that has a high quality, or "furniture quality" finish.

It is another object of the present invention to provide a method of fabricating a cover for a spa that is easily customizable.

It is another object of the present invention to provide a method of fabricating a cover for a spa that allows covers of different sizes and shapes to be quickly produced in a cost-effective manner.

It is another object of the present invention to provide a method of fabricating a cover for a spa that can be customized.

These and other objects are achieved by the present invention.

According to an embodiment of the present invention, a method of manufacturing an article for a spa includes laminating a cosmetic film to a base substrate; laminating an acrylic film to the cosmetic film, the base substrate, cosmetic film and the acrylic film forming a layered assembly, and forming the layered assembly to shape.

According to another embodiment of the present invention, a cover for a spa includes a first shell member having a base layer, a cosmetic film laminated to the base layer, and an acrylic film laminate to the cosmetic film, a second shell member nested with the first shell member and defining an interior space therebetween, and a foam within the interior space and bonded with the first shell member and the second shell member.

According to yet another embodiment of the present invention, a method of manufacturing a cover for a spa includes forming a first shell member, including laminating a cosmetic film to a base sheet, laminating an acrylic film to the cosmetic film, the base sheet, the cosmetic film and the acrylic film forming a first layered assembly, and vacuum forming the first layered assembly to shape. The method further includes vacuum forming a second shell member to shape, locating a high density, closed-cell foam within at least one of the first shell member and the second shell member, bringing the first shell member and the second shell member into nesting relationship to enclose the foam between the first shell member and the second shell member, and bonding the foam to the first member and the second shell member to create an integral structure.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
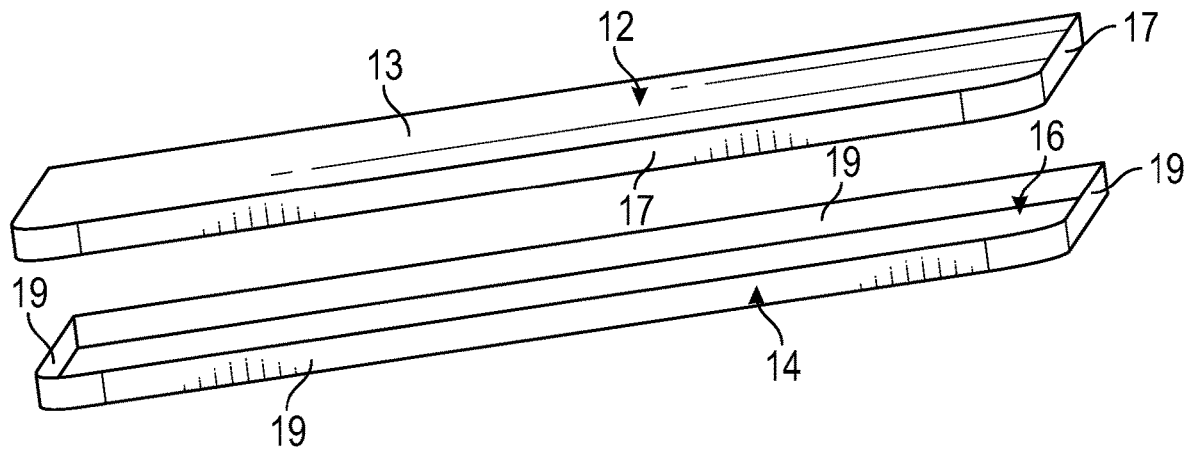
FIG. 1 is a top, perspective view showing the top and bottom halves of a spa cover, according to an embodiment of the present invention.
Figure 2:
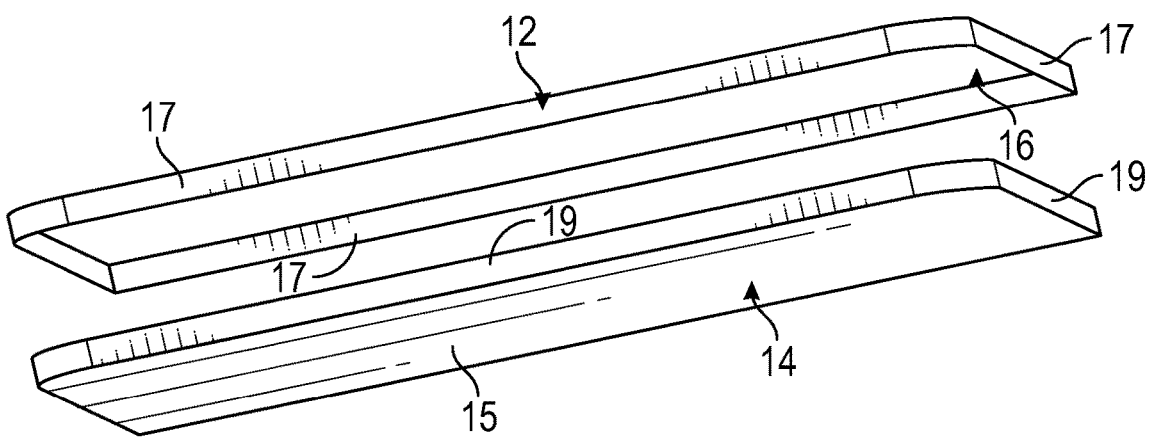
FIG. 2 is a bottom, perspective view showing the top and bottom halves of the spa cover of FIG. 1.

Referring to FIGS. 1-8, a cover assembly 10 for a spa is illustrated. As shown in FIGS. 1 and 2, the cover assembly 10 includes a top shell member 12 and a bottom shell member 14. Each of the shell members 12, 14 is generally rectangular in shape and includes an outer surface (e.g., outer surfaces 13, 15) and peripheral sidewalls (e.g., peripheral sidewalls 17, 19) extending from the outer surface defining therebetween an interior space 16. In an embodiment, the shell members 12, 14 are manufactured utilizing a vacuum molding process (or a pressure forming process). In the preferred embodiment, the shell members 12, 14 are manufactured from an acrylic material. For example, in the preferred embodiment, the shell members 12, 14 may be manufactured from one of acrylonitrile butadiene styrene (ABS) and polyvinyl chloride (PVC). In other embodiments, the shell members 12, 14 may be manufactured from other materials such as, for example, polyethylene (PE), without departing from the broader aspects of the present invention.

Figure 3:
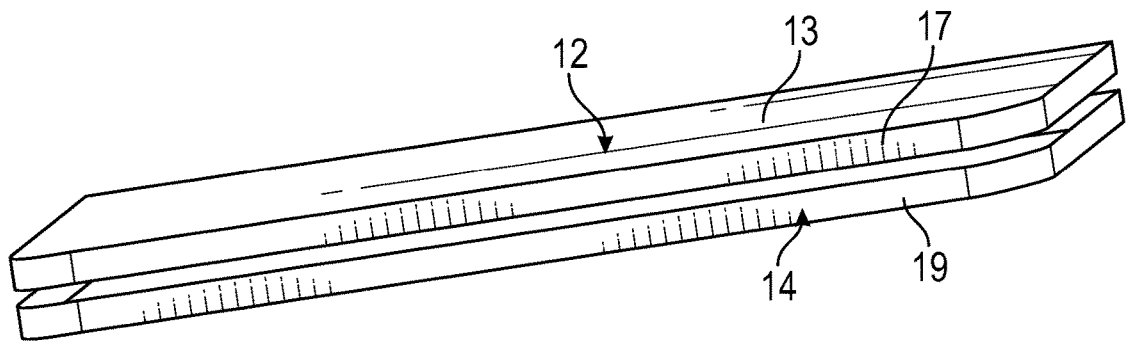
FIG. 3 is a perspective view showing the top and bottom halves being moved into registration with one another.
Figure 4:
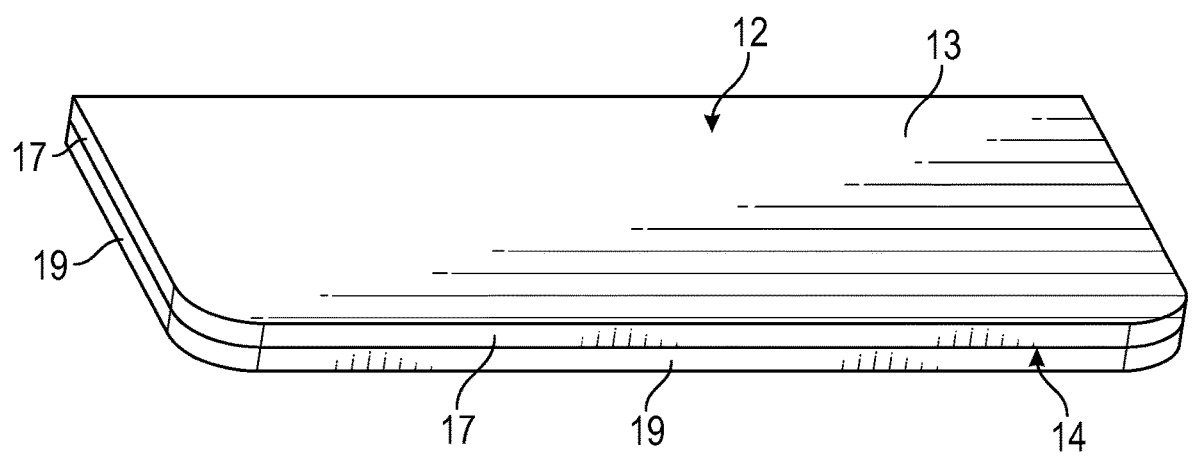
FIG. 4 is another perspective view showing the top and bottom halves being moved closer into registration with one another.
Figure 5:
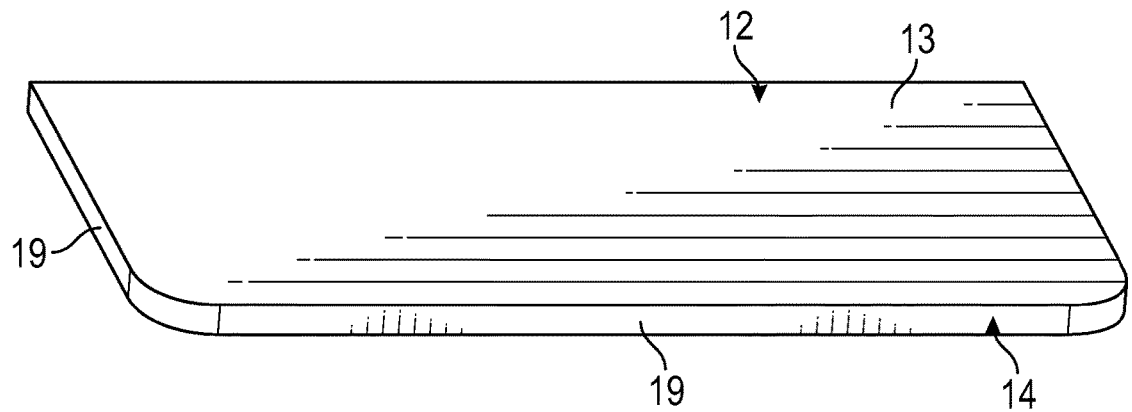
FIG. 5 is a perspective view showing the top and bottom halves in nesting arrangement with one another forming a hollow shell.

As best shown in FIGS. 3-5, once the respective shell members 12, 14 are formed via a vacuum molding process, they are brought into nesting registration with one another to form hollow cavity therebetween. For example, shell member 12 may be received inside shell member 14. The shell members 12, 14 may then be joined to one another using one or more of mechanical joints, adhesive, or welding to form a water-tight seal, as discussed in detail hereinafter.

Figure 6:
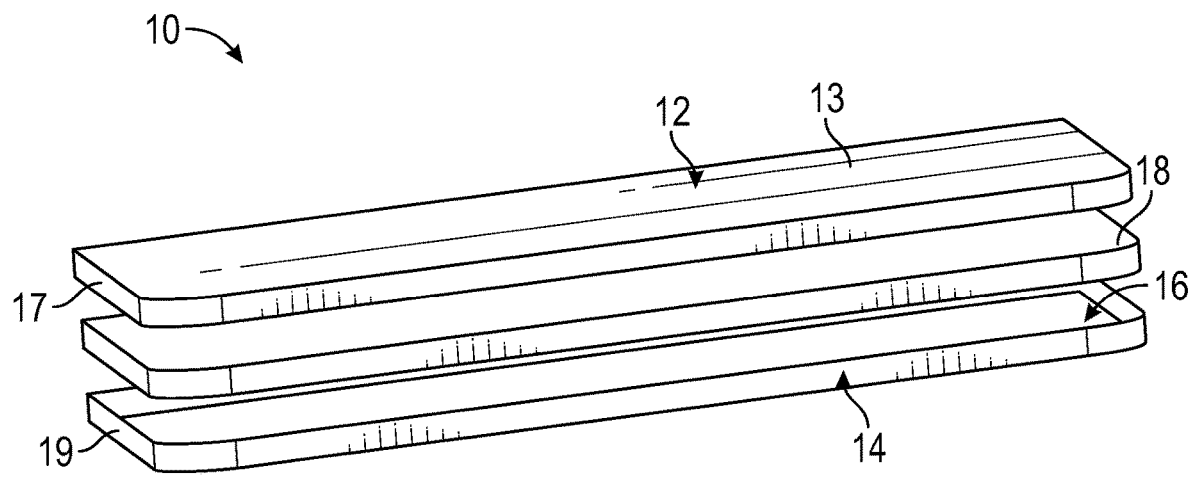
FIG. 6 is an exploded, perspective view of a cover for a spa showing the top cover member, bottom cover member and internal foam material.
Figure 7:
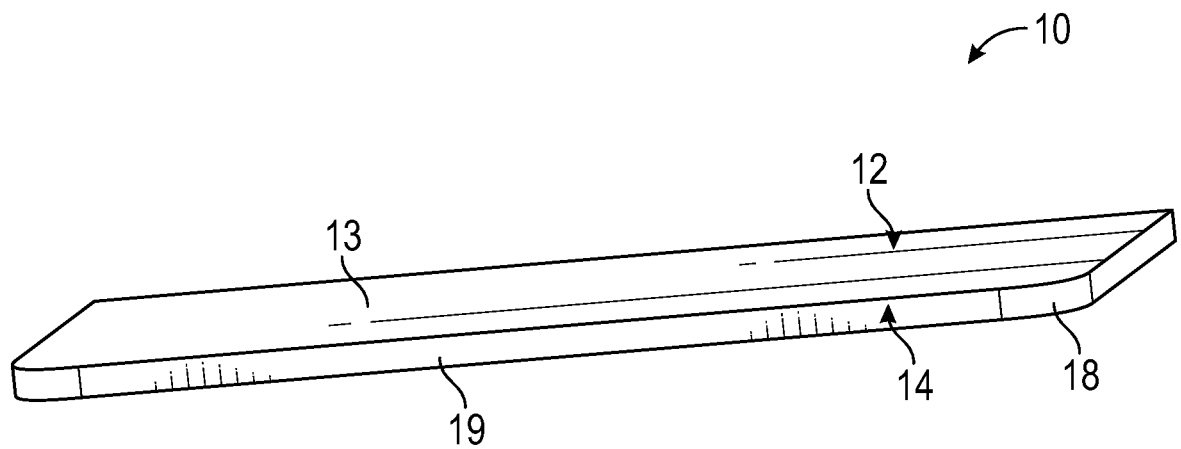
FIG. 7 is a perspective, partial cut-away view of the cover in an assembled state, illustrating the foam interior to the cover.
Figure 8:
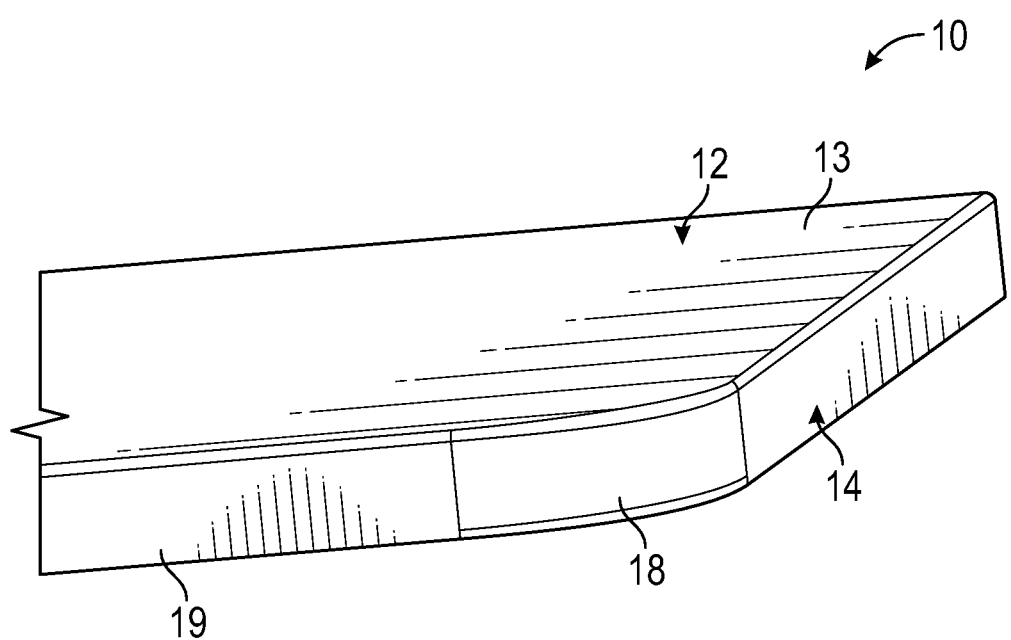
FIG. 8 is an enlarged, detail view of the cut-away section of the cover, showing the foam interior to the cover.

With reference to FIGS. 6-8, once the shell members 12, 14 are joined together, a foam 18 is injected or otherwise filled into the hollow cavity such as through an injection port or like opening (not shown) in the outer surface or peripheral sidewall of the shell members 12, 14. In the preferred embodiment, the foam 18 is a polyurethane foam. In other embodiments, the foam may be expanded polystyrene foam. In certain embodiments, a foam formed from other materials may also be utilized without departing from the broader aspects of the present invention.

Importantly, the foam 18 creates a bond with the vacuum formed shell members 12, 14. As a result, the shell members 12, 14 and foam 18 form a unitary, structural part. As will be readily appreciated, this bonding of the foam 18 to the shell members 12, 14 provides for increased structural rigidity and strength for the cover assembly 10 as a whole, obviating the need to utilize kiss-offs, ribs or other structural members within the cover that are typically more costly and time consuming to manufacture, and which can degrade the thermal efficiency of the cover. This is also in contrast to existing covers that utilize a free-floating foam within the cover (i.e., it does not create a bond with the interior surfaces of the shell members, which adds no structural rigidity or strength to the cover.

In an embodiment, the foam 18 may be a high-density foam, meaning a foam having a density in excess of 1.7 lb/ft3. Such high-density foam (defining a collapsed cell foam) will not absorb water, even if a breach in one of the shell members 12, 14 occurs. As a result, absorption of water and subsequent loss of strength and insulative properties, mold growth and the like, which have been known to plague existing polystyrene covers, can be obviated by the present invention.

While the embodiments described above disclose the filling of the cavity of with the foam after the shell member 12, 14 are brought into registration with one another, the present invention likewise contemplates that the foam may be deposited or located within one of the shell members 12, 14 prior to bringing the shell members together and sealing the shell members to one another. For example, in an embodiment, foam may be deposited into bottom shell member 14, and then top shell member 12 may be brought into registration with the bottom shell member 14 and sealed thereto along the edges, and with the foam, in the manner discussed above.

Importantly, manufacturing the respective shell members 12, 14 using a vacuum molding process allows for covers in a wide range of shapes, sizes, colors and the like to be quickly, easily and inexpensively produced. In particular, vacuum molds can be made and adjusted inexpensively compared to rotational molds and blow molds which have been typically utilized in the industry. This provides the ability to produce covers of any size to fit any size spa produced. In addition, vacuum molding allows such covers to be produced in a rapid manner, so that after-market cover production is possible without having to produce hundreds of different stock keeping units (skus) and thousands of covers in inventory. Indeed, the method of the present invention allows hard covers for spas to be produced on demand, as sales warrant (i.e., just-in-time manufacturing).

Further to the above, vacuum molding using acrylic allows for the subsequent injection of a polyurethane foam that bonds to the surrounding acrylic shell halves to create an integral structural part. This simply cannot be achieved with rotational molding and other molding methods which cannot use acrylics. Importantly, it is the combination of the acrylic, vacuum formed shell and the polyurethane, high-density or similar foam that enables the foam to bond to the shell to create an integral, structural part that is capable of supporting substantial load.

Figure 9:
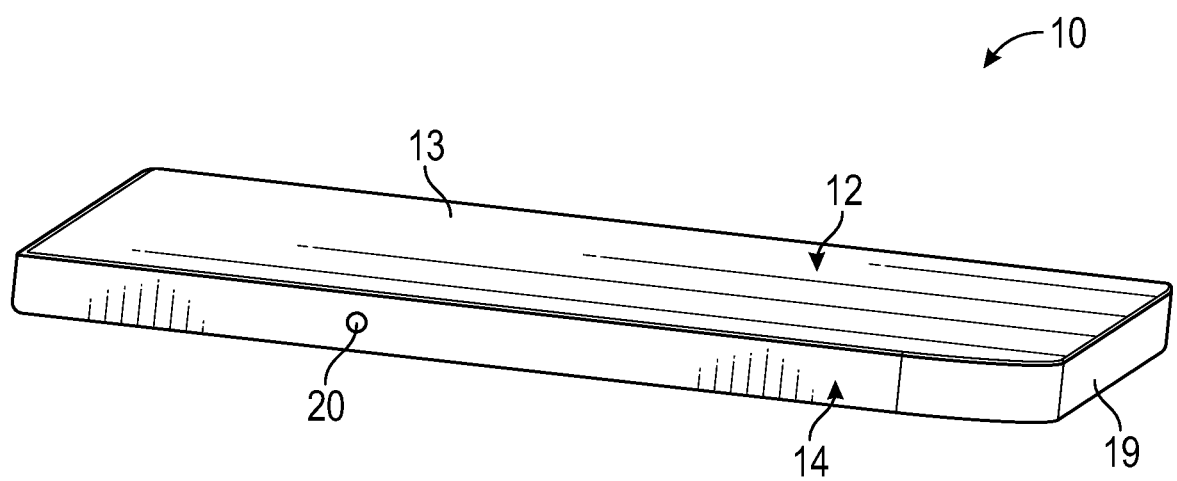
FIG. 9 is a perspective view of a cover showing a lifting aperture or channel formed therein.
Figure 10:
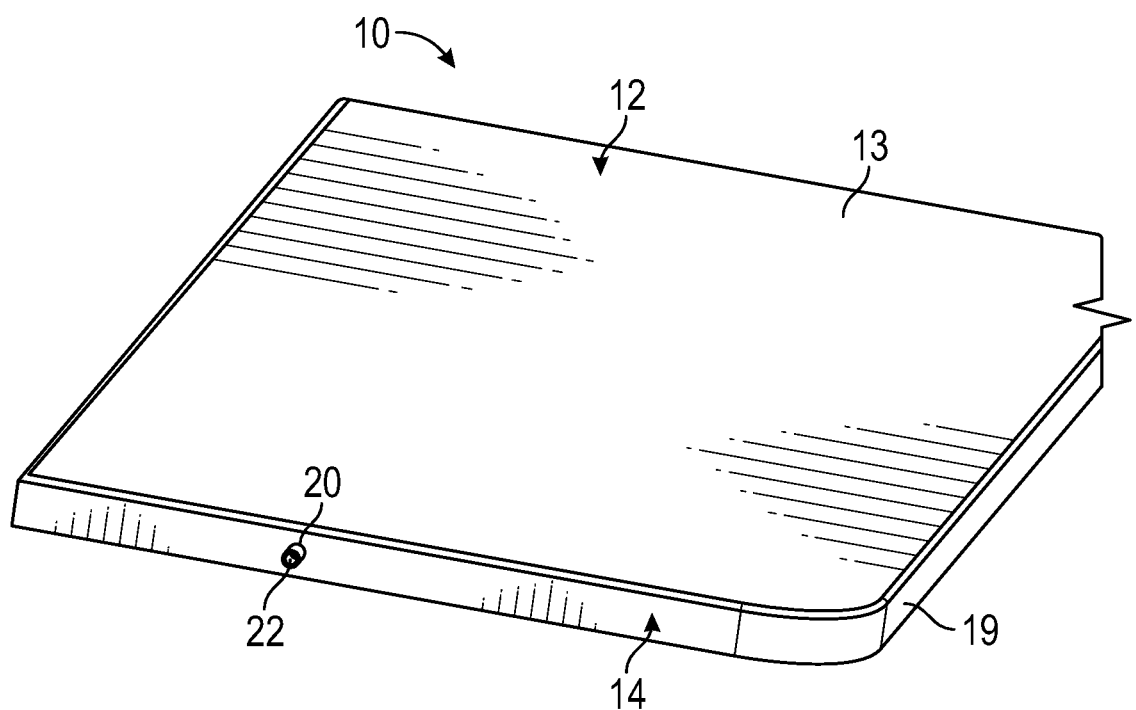
FIG. 10 is a perspective view of the cover of FIG. 9, showing a pipe extending through the lifting channel in the cover.
Figure 11:
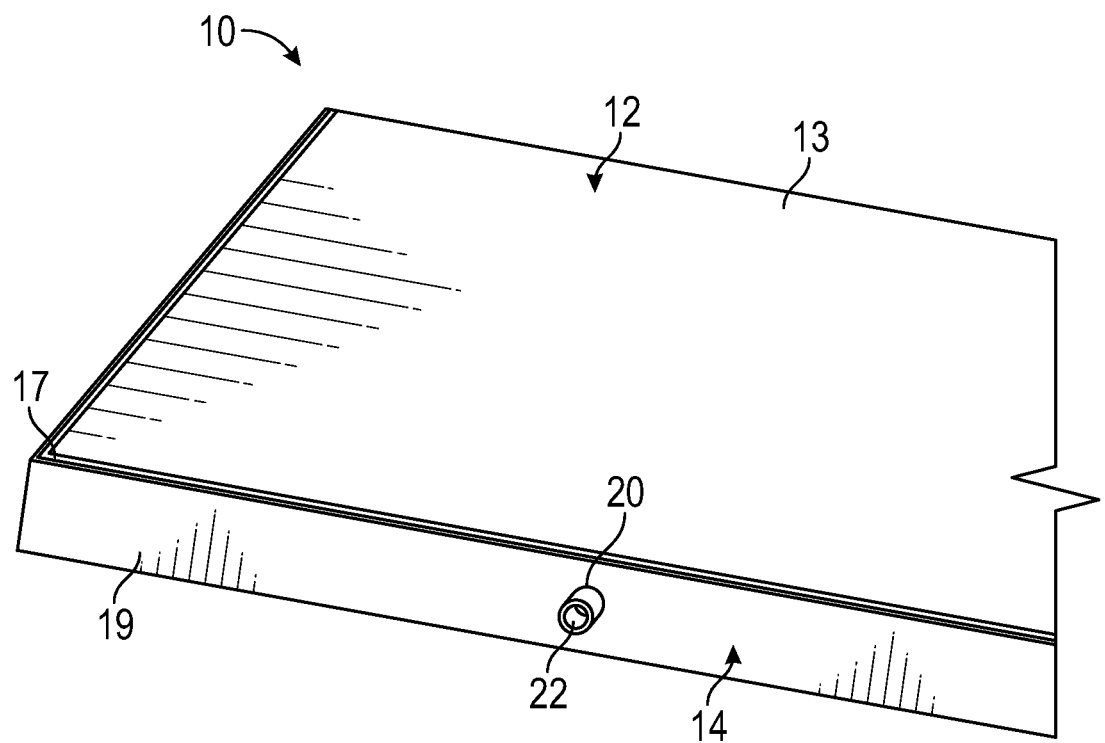
FIG. 11 is an enlarged, perspective view of the cover of FIG. 10.

Referring now to FIGS. 9-12, in an embodiment, the cover assembly 10 may also include a variety of specific configurations that facilitate opening and closing of the cover. For example, in an embodiment, the cover assembly 10 may be manufactured devoid of any apertures or channels for accommodating a lifting mechanism or handle. In another embodiment, as shown in FIG. 9, the cover assembly 10 may be formed with a hole or channel 20 in the side thereof through which a lifting rod (not shown) may be inserted. As shown in FIGS. 10 and 11, the cover assembly 10 may alternatively be formed with the hole 20 and a pipe 22 (e.g., a PVC pipe) extending therethrough. In this embodiment, the pipe 22 is preferably sealed to the cover to prevent the incursion of water, and the pipe 22 is configured to receive a lifting rod of a lifting mechanism therethrough.

Figure 12:
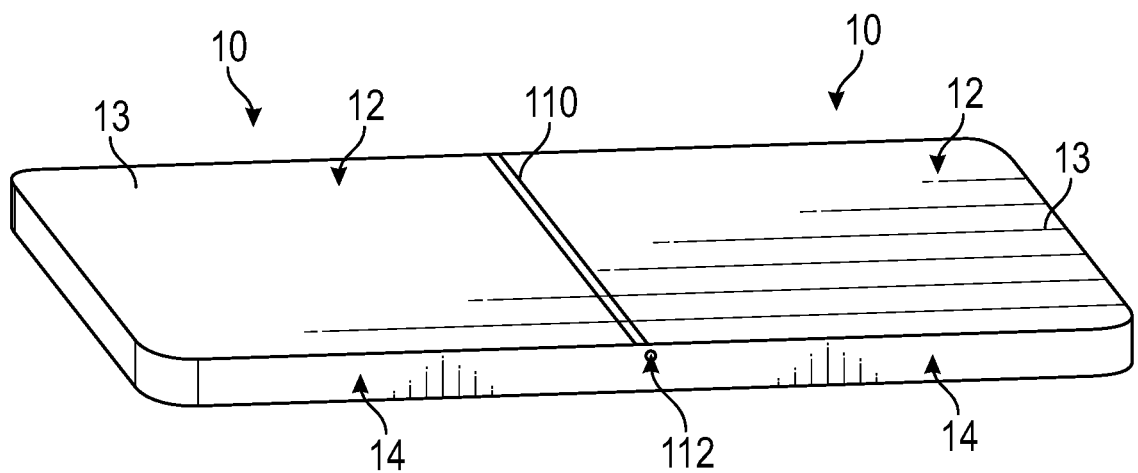
FIG. 12 is a perspective view of a cover assembly having two cover member halves.
Figure 13:
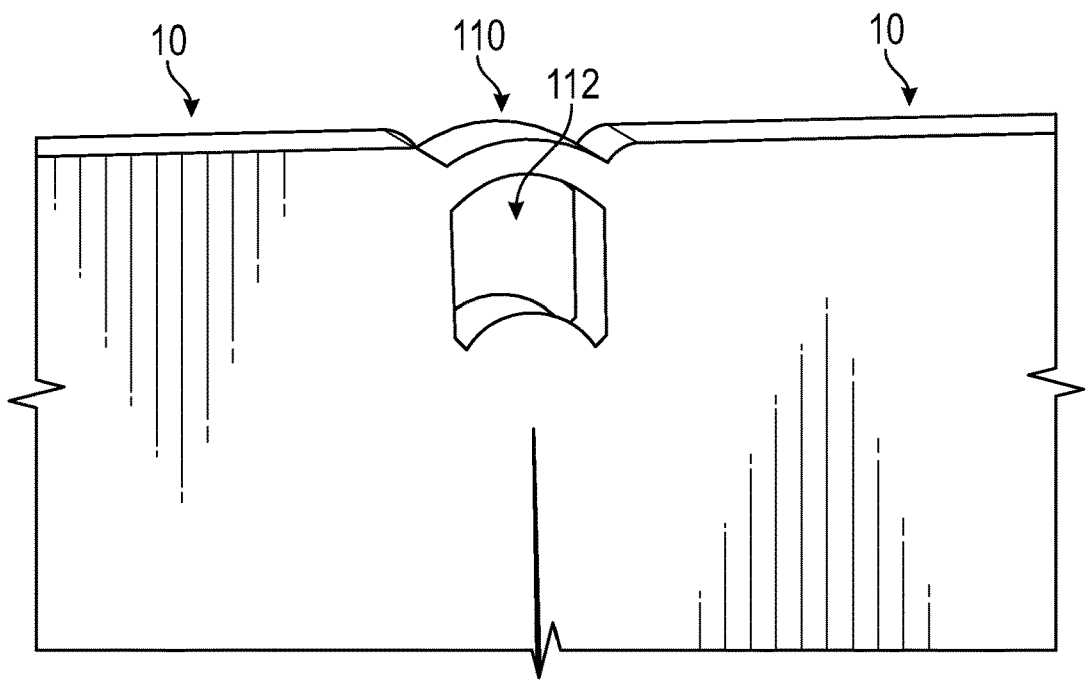
FIG. 13 is an enlarged, perspective view of the cover assembly of FIG. 12, illustrating a seal and lift channel thereof.
Figure 14:
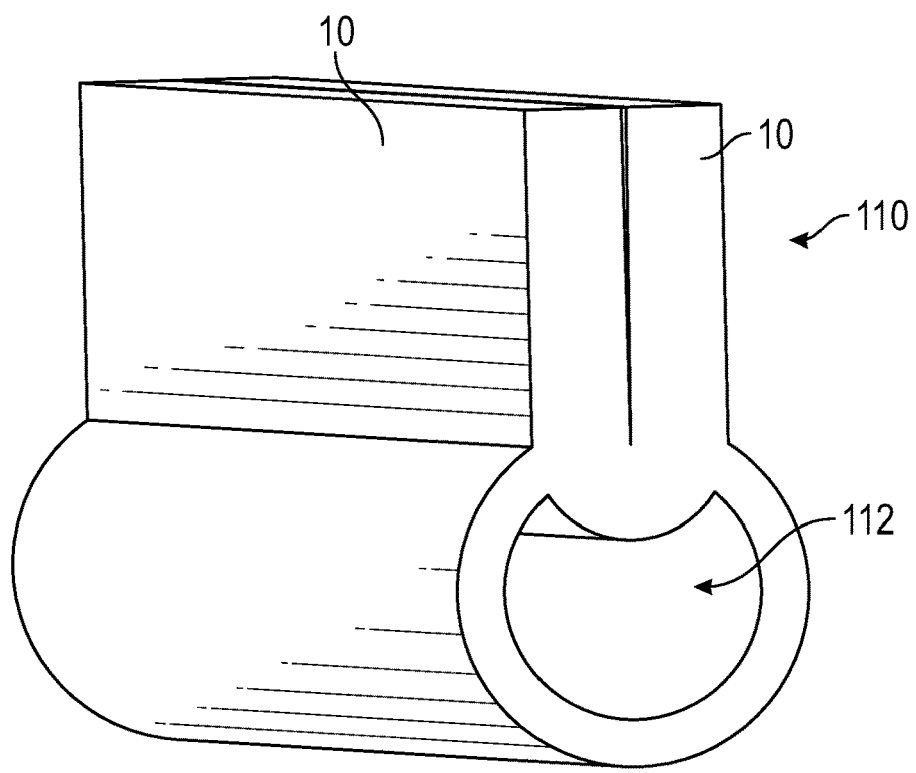
FIG. 14 is an enlarged, perspective view of the seal and lift channel.
Figure 15:
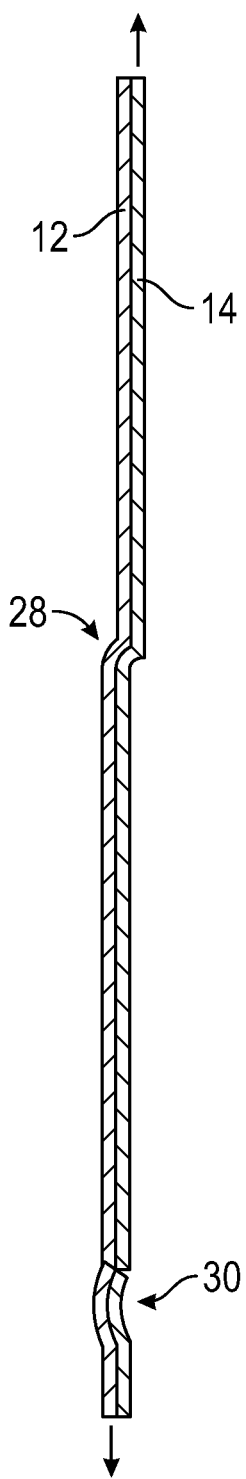
FIG. 15 is a detail, cross-sectional view top and bottom halves of a cover, illustrating locking features thereof.

With reference to FIG. 12, a cover assembly 100 may alternatively include a central seal 110 that joins two opposed cover halves 10. The seal 110 doubles as a lift hole 112 for a lifting rod of a lifting mechanism. As illustrated in FIG. 12, two cover assemblies 10 may be joined together by the seal 110 to form cover 100 that covers the entire spa. In an embodiment, the seal 110 may be joined to the cover halves through an adhesive, welding or other bonding means known in the art. As best shown in FIG. 13, this seal 110 forms a channel 112 running the width of the cover 100 through which a lifting rod may be inserted. During an uncovering operation, the cover 100 is folded upon itself and then lifted by the lifting rod from atop the spa. FIG. 14 illustrates a simplified view of the central seal 110 and channel 112.

Figure 16:
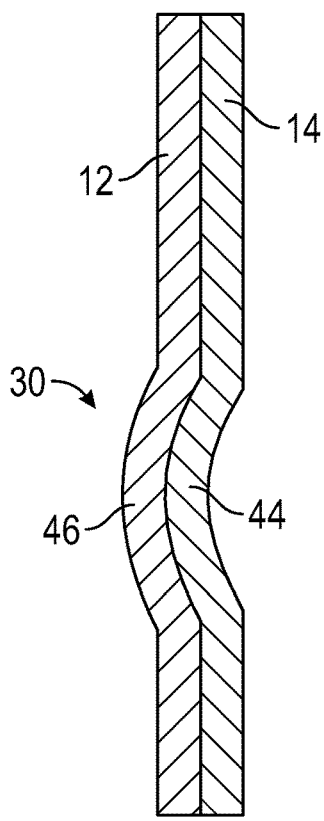
FIG. 16 is an enlarged view of a first locking feature of the cover.
Figure 17:
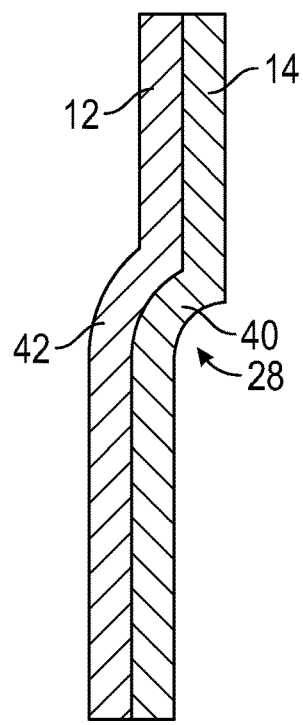
FIG. 17 is an enlarged view of a second locking feature of the cover.

Turning now to FIGS. 15-19, a manner in which the two vacuum formed halves 12, 14 of the cover assembly 10 can be joined together is illustrated. As shown therein, each of the shell members 12, 14 (and in particular, the sidewalls 17, 19 of the shell members 12, 14) may be formed with one or more cooperative locking features or joints, such as a first joint/locking feature 28 and a second joint/locking feature 30. As best shown in FIGS. 16 and 17, the first and second joints 28, 30 may be formed as bends or projections within the shell members 12, 14. For example, as illustrated in FIGS. 16 and 17, the first joint 28 may be formed as cooperative bends 40, 42 (e.g., male and female) in the first and second shell members 12, 14, while the second joint may be formed as cooperative dimples or arcuate projections 44, 46 (e.g., male and female) in the first and second shell members 12, 14. The bends/projections 28, 30 are preferably formed in the shell members 12, 14 as part of the vacuum molding process.

Importantly, the slight resiliency of the shell members 12, 14 permits then to slide into nesting arrangement with one another rather easily. When the foam 18 is injected into the hollow cavity after the shell members 12, 14 are joined together, however, the foam expands, causing the joints/locking features 28, 30 in the respective shell members 12, 14 to lock together, thereby mechanically preventing the shell from sliding apart. In particular, the shell members 12, 14 are prevented from sliding or moving relative to one another in the direction of the arrows shown in FIG. 15 (and in any direction) because of the cooperative locking features 28, 30 (i.e., the male projection or dimple is received in the corresponding female recess. This feature, in concert with the adhesive or welding along the joint interface, forms a lasting and impenetrable seal, impervious to water.

Figures 18, 19:
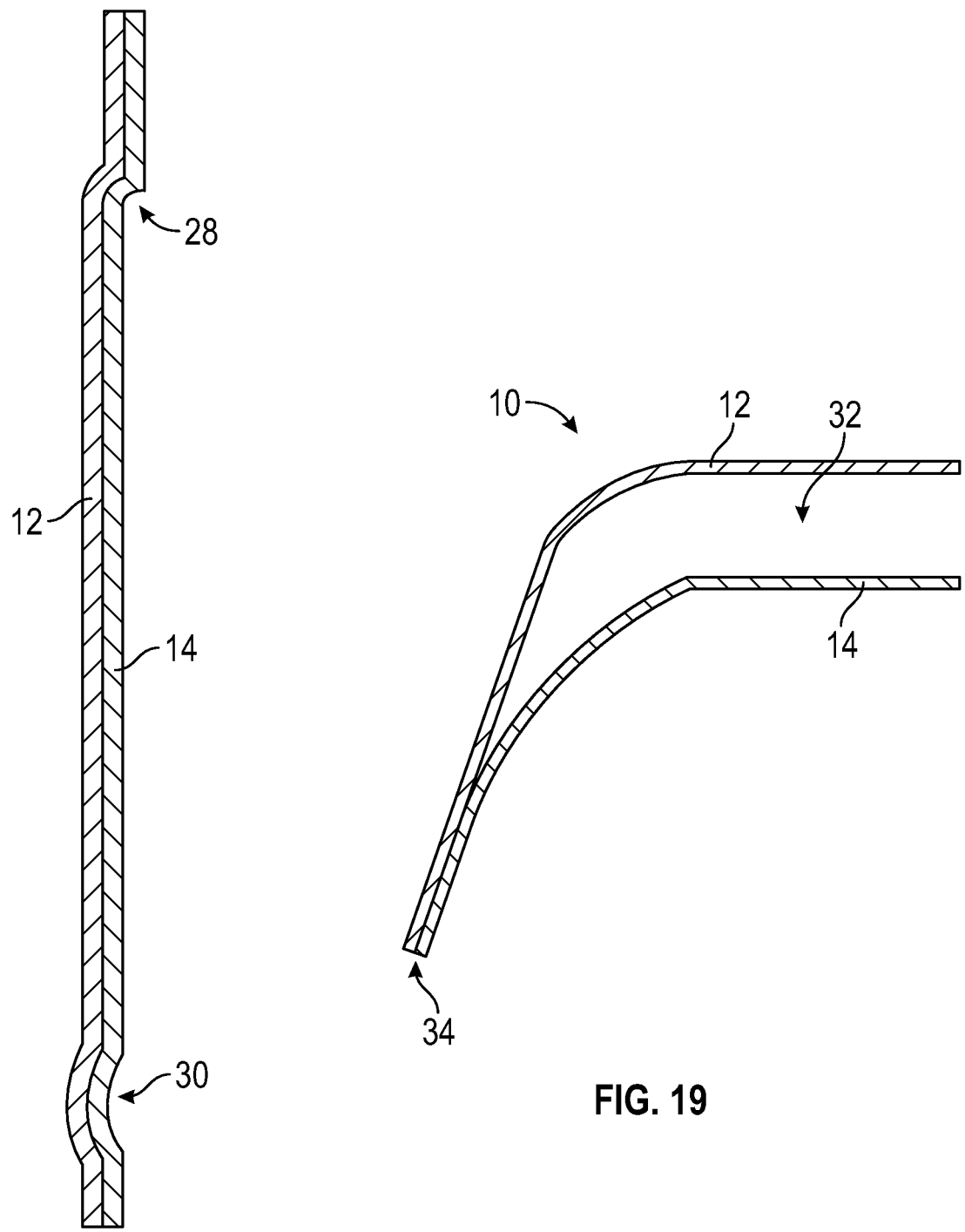
FIG. 18 is a cross-sectional view of the cover showing the outer wall in locked position.
FIG. 19 is an enlarged, cross-sectional view of a portion of a cover, illustrating the joining of the two halves thereof.

With reference to FIG. 19, the hollow cavity 32 of the cover assembly 10 may also be formed by nesting the two shell members 12, 14 into each other, as shown. The halves 12, 14 can then be easily glued or thermally joined at joint 34. In addition, as illustrated in FIG. 19, utilizing this process, the joined ends (i.e., at 34) can be molded or shaped to form a skirt that closes registers with the shell or sides of the spa. This can potentially obviate the need to utilize a separate vinyl or plastic skirt around the periphery of the spa, decreasing costs overall, and improving aesthetics of the spa, as a whole.

In addition to the above, by vacuum forming the respective shell members 12, 14 using the materials mentioned above, the color of the cover assembly 10 can be easily changed, many different patterns are possible, and a much smoother and glossier finish can be achieved as compared to existing methods. In connection with this, the method and resulting cover assembly of the present invention allows for images to be adhered to the cover assembly (which has heretofore not been possible due to the rough finish of existing hard covers). In some embodiments, the finish provided by the vacuum molding process also allows for painting of the molded cover to provide an even more customized and finished look. Moreover, by utilizing a vacuum molding process, raised or sunken in reliefs may be molded into the cover assembly to create unique designs, words, phrases and the like.

While the embodiments described above contemplate the injection of polyurethane foam into the hollow interior cavity after the halves are joined together, preformed or precut foam inserts may also be utilized. In particular, in an embodiment, a preformed foam insert that closely matches the interior shape and size of the shell members may be placed inside the hollow cavity and an adhesive utilized to bond the insert to the respective shell halves as the halves are brought together to enclose the insert. In yet other embodiments, liquid polyurethane may be poured into the hollow cavity, or Styrofoam pellets blown into the hollow cavity, to form the foam interior.

Figure 20:
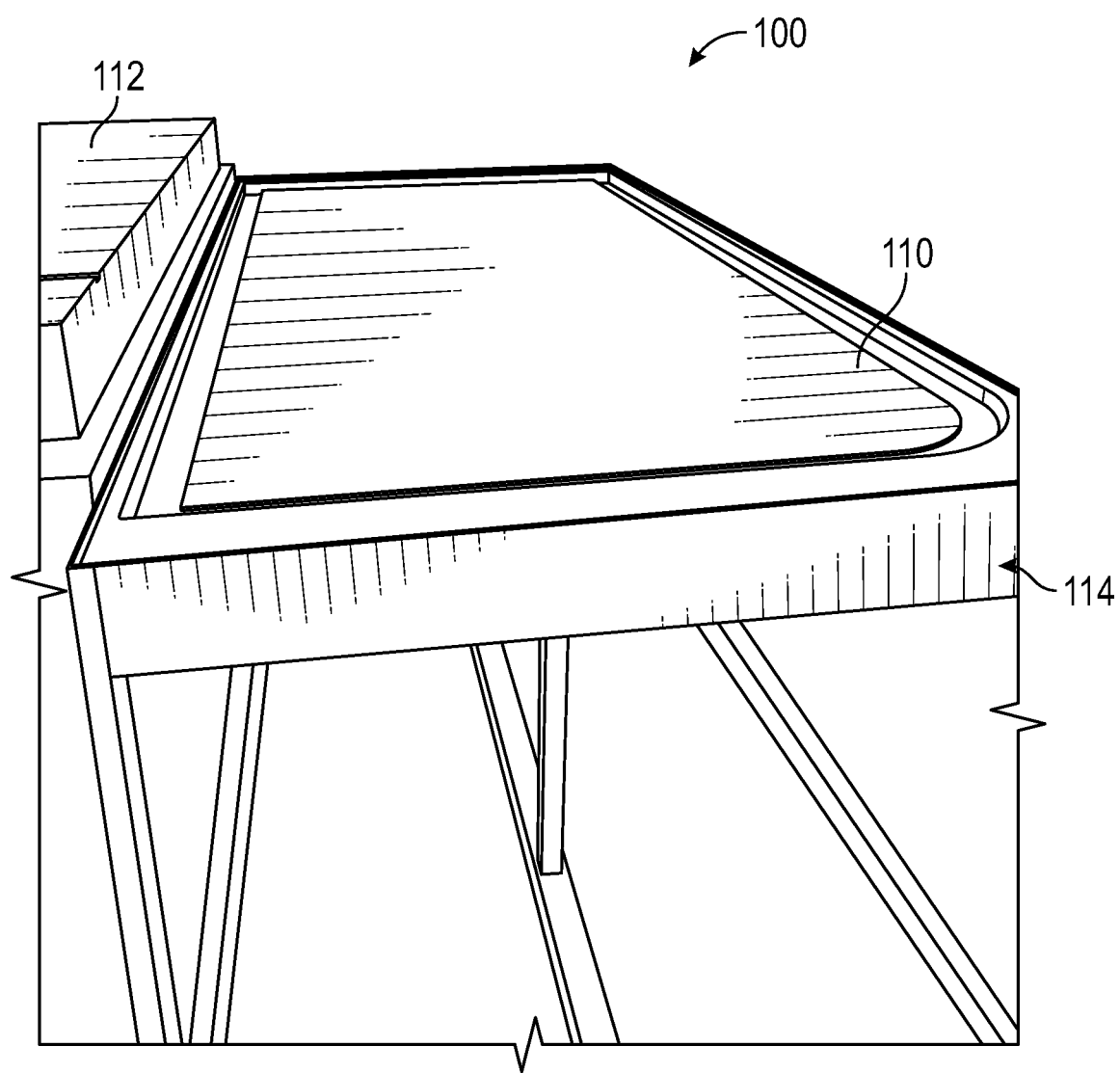
FIGS. 20-22 illustrate to and bottom shell members of a cover member, according to an embodiment of the present invention.
Figure 21:
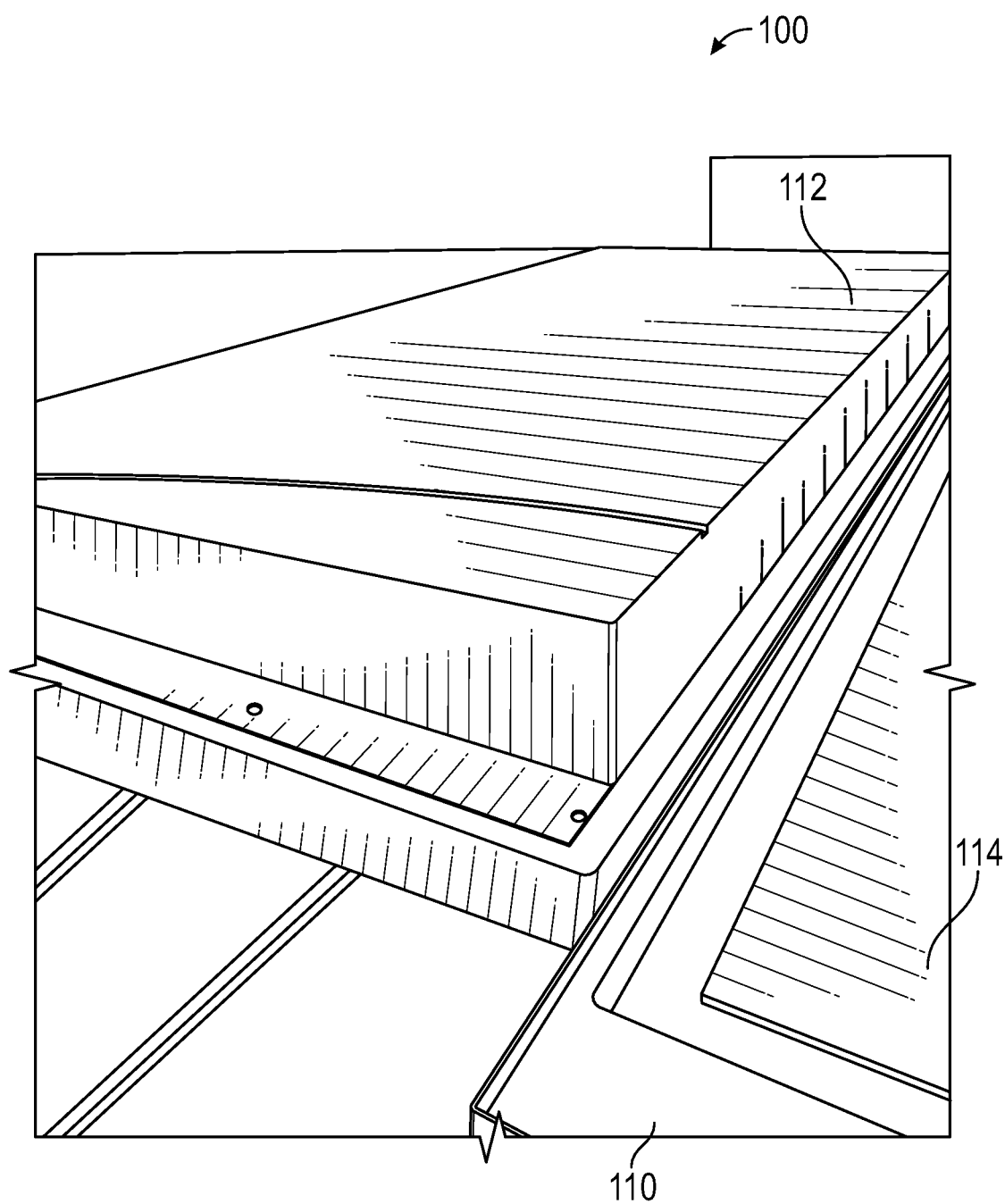
Figure 22:
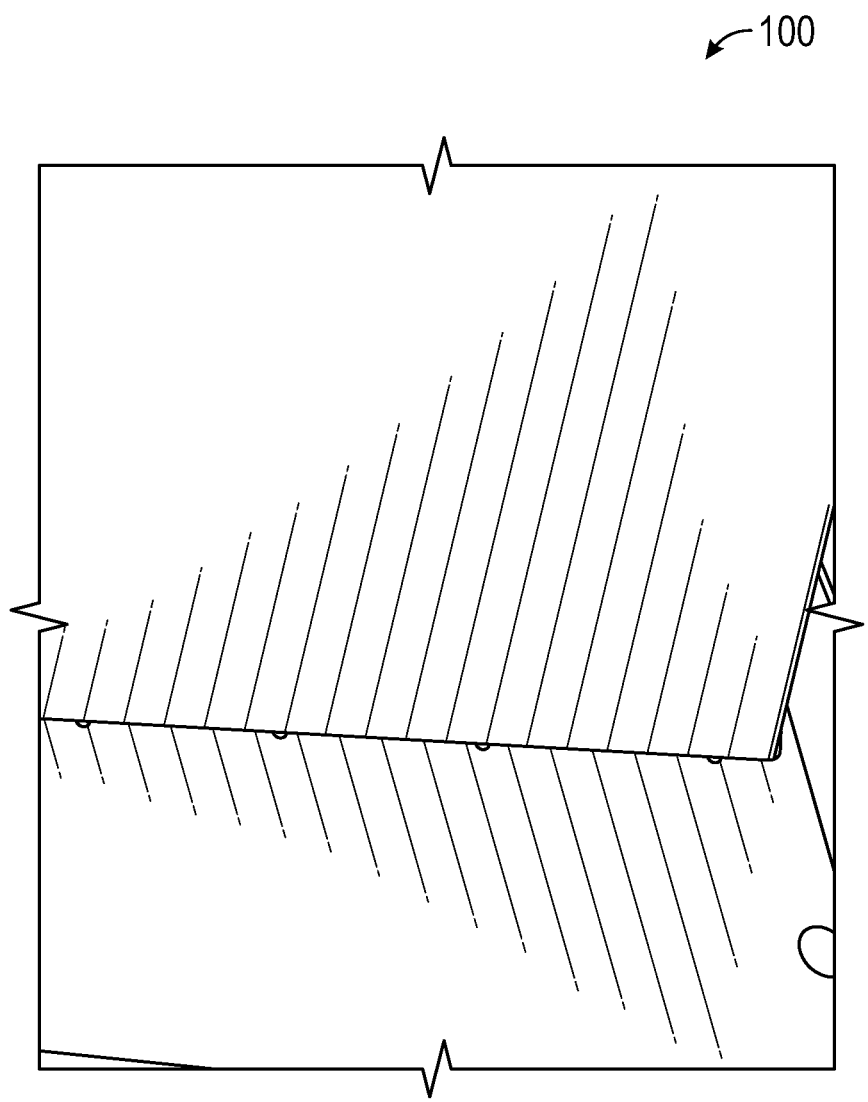

Referring now to FIGS. 20-24, articles for a spa that may be formed using a fabrication method according to another embodiment of the present invention are illustrated. For example, FIGS. 20-22 illustrate a cover member 100 for a spa that is formed via the fabrication method discussed hereinafter. In an embodiment, sheets of ABS are utilized as a base substrate for the cover members 100, which includes a top cover member/shell 112, a bottom cover member/shell 114 and an insulating foam 110 sandwiched between the top cover member 112 and the bottom cover member 114, as described below. For example, 48"×96" and 52"×100" special order sheets of ABS, such as those manufactured by Positron Corporation may be utilized.

Figure 25:
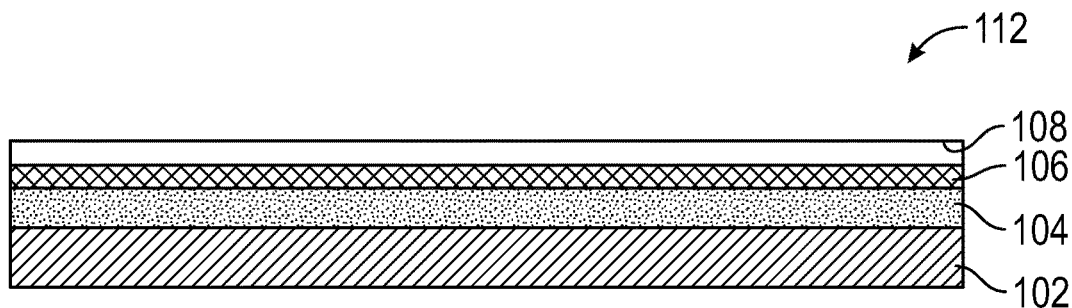
FIG. 25 is a cross-sectional illustration of the cover member of FIGS. 20-22, showing the various layers thereof.

With reference to FIG. 25, in an embodiment, a cosmetic film 104 is then laminated to the ABS sheet 102. In an embodiment, the cosmetic film 140 may be a thin polymer film of wood grain, carbon fiber, white pearl, or any desired color or surface finish. After the cosmetic film 104 is laminated to the ABS sheet 102, a thin film 106 of acrylic with a UV protectorant in it is then laminated on top of the cosmetic film 104, and then a protective plastic film 108 is adhered atop the acrylic film 106 to protect the laminated assembly prior to vacuum drawing, as discussed in detail hereinafter. As illustrated in FIG. 25, therefore, prior to vacuum forming, the assembly that forms cover member 112 or 114 includes an ABS substrate 102, a cosmetic film 102 atop the substrate, an acrylic layer 106 atop the cosmetic film 104, and a removable protective film atop the acrylic layer 106. When ready for vacuum drawing or forming by other means, the protective film is first removed.

Importantly, the cosmetic film 104 allows the cover member to be manufactured to look like any type of material such as wood, plastic, marble or the like. In particular, the cosmetic film 104 allows the cover members to take on a 'furniture-quality' wood appearance. This type of finishing has heretofore not been possible in the spa and cover manufacturing industry.

To form the cover member 100, the laminated sheets/assembly are heated up to approximately 350 F degree in a ceramic heater-heated oven. The heated sheets are then vacuum formed over several male/female molds specifically designed to keep the film-laminated-sides of the ABS free from any contact with the mold surfaces. The thermal cycle of the heating to temperature and draw fuses the acrylic layer on to the ABS/laminate sheet.

In an embodiment, the four corners of the cover member are formed simultaneously from a single sheet in one vacuum draw. As illustrated in FIGS. 20 and 21, the top side/shell of the cover member 100 is formed from a single sheet, and the bottom side/shell of the cover is formed from a single sheet. As will be readily appreciated, as discussed above, the cover member 100 is formed from a separate top shell member and a bottom shell member that are joined together. After molding each of the shell members, the shell members are cooled to about 130 F, and a protective film is applied to the film side surfaces (i.e., the outward facing, exposed surfaces). This protective film remains on the shell members through the entire manufacturing process.

Next, the four formed corners are placed onto a specially designed vacuum fixture designed to hold them in place and support them from caving due to the vacuum hold down pressure. The corners are then cut away from the vacuum form flashing with a built air router tool that rides on a guide channel inside the corner. In this manner, no external fixturing is required, which could otherwise obstruct the cut and provide a hazard that could possibly contact the film side surface and scratch it. The corners are cut to size and are now ready for hole drilling and placement on a spa.

After the corners are cut, the one of the shell members is placed in a nesting vacuum fixture, which uses vacuum suction to hold it in place. The vacuum forming flashing is then trimmed away from the inside of the shell member with a slitting blade/endmill tool.

Next, the cover member is cut to a predetermined gluing height in one operation. In particular, the cover member is cut so that there is sufficient surface area to form a bond of a minimum of 1 inch wide between the top cover member and the bottom cover member.

The bottom cover member is then placed on a pedestal fixture that holds it in place. The flashing is then hand cut off from the bottom cover member with a Dremmel or similar tool. This step is performed in this manner because there is a groove formed in the flashing area to follow for the cut, and it is a lot faster to cut it this way than it is to put it in the router and do it and it does not require precision.

With reference to FIG. 20, pieces of Expanded Polystyrene (EPS) are then cut to fit into any cavities or grooves within the top and bottom cover members 112, 114. A main EPS block that spans most of the thickness of the cover is then cut. The smaller cavity/groove pieces are glued in place within the top and bottom cover member, and then the main EPS block that spans from top to bottom is then glued to the bottom cover member 114. The glue/adhesive is then allowed to dry and set up.

Next, a 1¼" black PVC tube is cut to length for insertion in the top cover member 112 of the cover 100. Two holes are drilled in the top cover member 112 of the cover, in opposite sides (major length dimension) so that the PVC tube can be inserted thru through the top cover member. The PVC tube is then glued in place from the inside of the cover with a retainer ring, holding and sealing the tube in place. This tube is later used for inserting the cross bar of the lift mechanism. The glue is allowed to set up and dry. These holes are dimensioned and so located so that the cover when assembled and filled with foam, will tilt when lifted and stand vertical along the sides of the spa when in the open position.

To assemble the top cover member 112 to the bottom cover member to form the cover 100, the bottom cover member 114 with the EPS block 110 glued in place is set on the gluing pedestal. Both the EPS in the top and the EPS on the bottom are sprayed with an adhesive. In an embodiment, the adhesive is a high temperature EPS compatible glue that will withstand the high temperatures of at least about 140 to 150 F that the top cover member 112 may see in the hot sun. The adhesive is allowed to tack up. At this point a methyl methacrylate glue is applied to one side of the ABS to ABS glue joint (between the top cover member and the bottom cover member), and the top and bottom cover members are then assembled together. Weights are then applied to the top to compress the entire assembly together and a special bonding fixture that has inflatable bladders that match the outside profile of the cover is clamped into place and inflated with adequate pressure to press the two sides (top piece and bottom piece) of the glue joint together and hold it there for one hour.

After one hour, the pressure is released from the clamping bladder and the fixtures are removed, and the fully glued cover 100 is set off to the side to cure overnight. After about 15 hours or more of cure time, the fully glued cover assembly 100 is inserted into a vacuum nesting fixture and the glued ledge is trimmed to final dimensions with the slitting saw in the router.

The cover assembly is then removed from the vacuum fixture and place on an examination table. The total length of the bond interface is then examined visually. If any voids are detected, they are filled with glue and clamped. The assembly is then allowed to cure for at least one hour. Any glue repaired regions are sanded and buffed. The cover is now ready to be paired with its other half and installed on a spa. Lastly, before installation the cover is inspected for any reparable scratches and the scratches repaired with a special scratch repair compound, commercially available.

Figure 23:
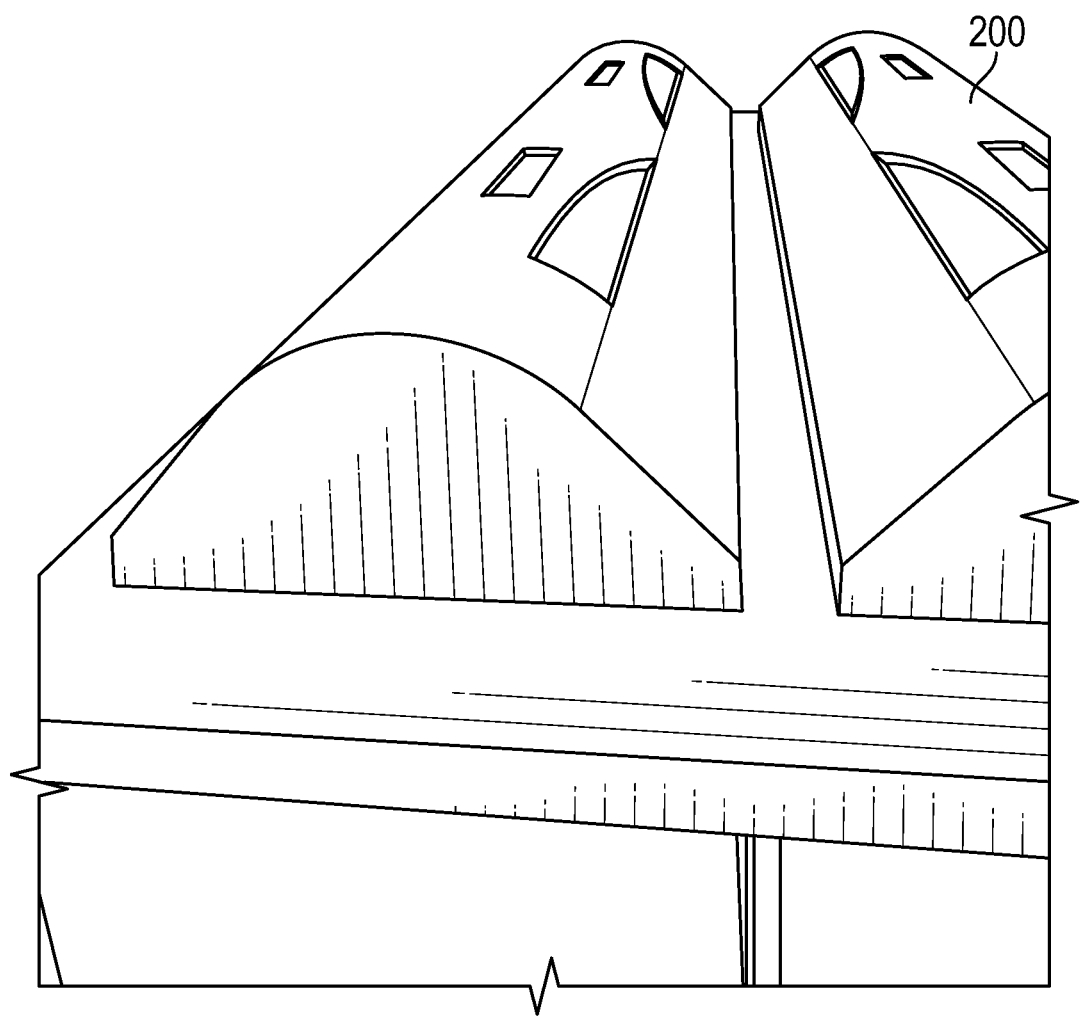
FIGS. 23 and 24 illustrate an accessory for a spa, according to an embodiment of the present invention.
Figure 24:
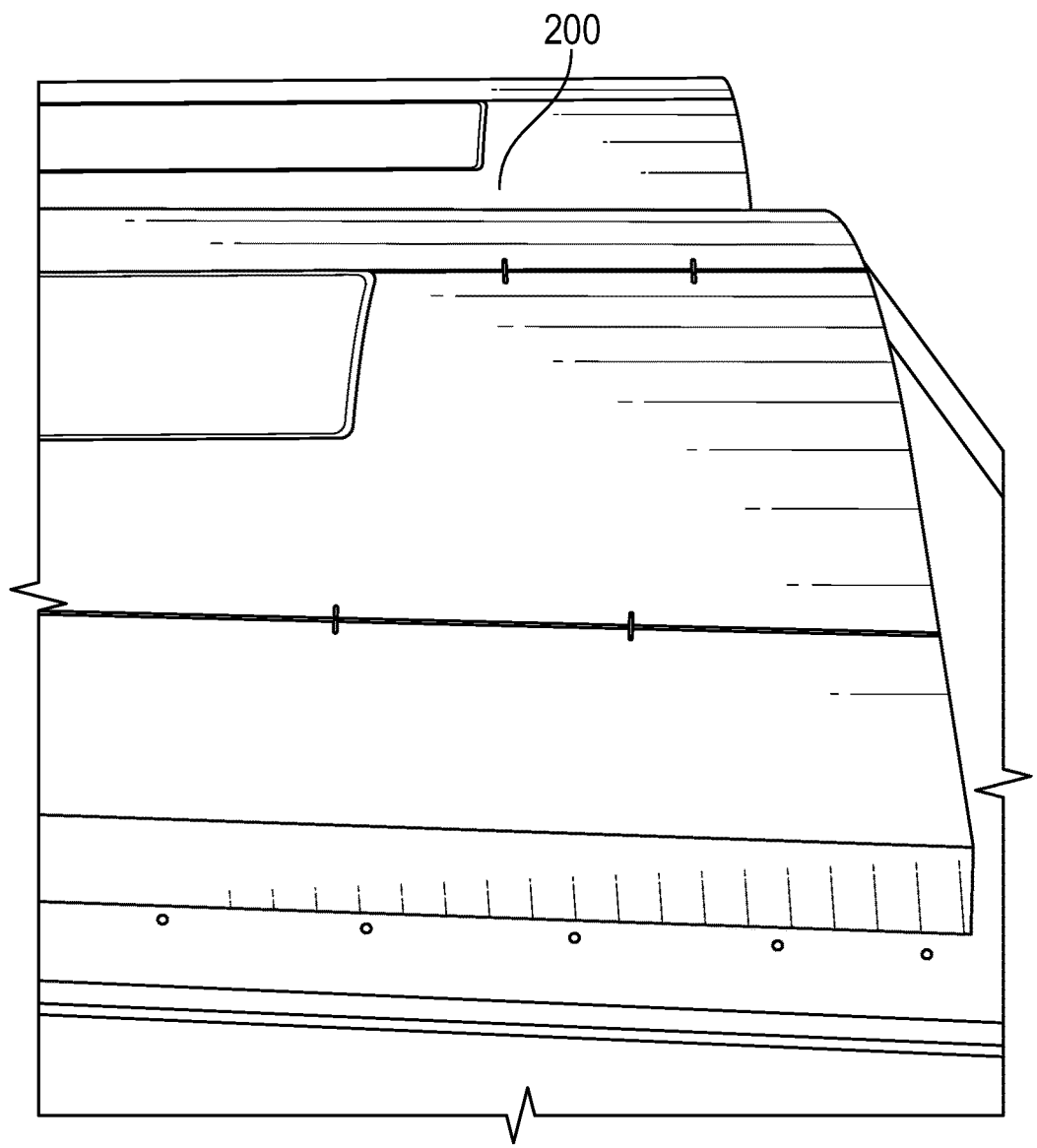

With reference to FIGS. 23 and 24, other spa components and accessories, such as decorative corner members 200, may also be formed in the manner described herein.

While the present invention has been described above in connection with the manufacture of a cover for a spa, the invention is not so limited in this regard. In particular, it is envisioned that the method described above may also be utilized to provide various other articles of manufacture where a foam may be utilized to provide interior strengthening and rigidity for a hollow article by bonding with the interior surfaces of such article. For example, various other spa parts may be manufactured by the process described herein including, but not limited to, spa bases, spa doors and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method of manufacturing an article for a spa, comprising the steps of:
    laminating a cosmetic film to a base substrate;
    laminating an acrylic film to the cosmetic film, the base substrate, cosmetic film and the acrylic film forming a layered assembly; and
    forming the layered assembly to shape.

2. The method according to claim 1, further comprising the step of:
    adhering a protective film to the acrylic film.

3. A method of manufacturing an article for a spa, comprising the steps of:
    laminating a cosmetic film to a base substrate;
    laminating an acrylic film to the cosmetic film;
    adhering a protective film to the acrylic film, the base substrate, cosmetic film and the acrylic film forming a layered assembly; and
    forming the layered assembly to shape;
    wherein the protective film is removable from the acrylic film.

4. The method according to claim 3, wherein:
    the base substrate is a sheet formed from one of acrylonitrile butadiene styrene (ABS) and polyvinyl chloride (PVC).

5. The method according to claim 4, wherein:
    the acrylic film includes a UV protectorant.

6. The method according to claim 3, wherein:
    the step of forming the layered assembly to shape includes vacuum forming the layered assembly.

7. The method according to claim 6, further comprising the step of:
    heating the layered assembly prior to vacuum forming.

8. The method according to claim 7, wherein:
    the layered assembly is heated to approximately 350 degrees Fahrenheit.

9. The method according to claim 3 wherein:
    the cosmetic film is a polymer film having a wood grain or carbon fiber finish look.

10. The method according to claim 3, wherein:
    the cosmetic film is a colored polymer film.

11. A cover for a spa, comprising:
    a first shell member having a base layer, a cosmetic film laminated to the base layer, and an acrylic film laminated to the cosmetic film; a
    a second shell member nested with the first shell member and defining an interior space therebetween; and
    a foam within the interior space and bonded with the first shell member and the second shell member.

12. The cover of claim 11, wherein:
    the cosmetic film is a polymer film having a wood grain or carbon fiber finish look.

13. The cover of claim 11, wherein:
    the cosmetic film is a colored polymer film.

14. The cover of claim 11, wherein:
    the base layer is formed from one of acrylonitrile butadiene styrene (ABS) and polyvinyl chloride (PVC).

15. The cover of claim 11, wherein:
    the acrylic film includes a UV protectorant.

16. The cover of claim 11, further comprising:
    a protective film removably affixed to the acrylic film.

17. A method of manufacturing a cover for a spa, comprising the steps of:
    forming a first shell member, including:
        laminating a cosmetic film to a base sheet;
        laminating an acrylic film to the cosmetic film;
        removably applying a protective film to the acrylic film, the base sheet, the cosmetic film and the acrylic film forming a first layered assembly; and
        vacuum forming the first layered assembly to shape;
    vacuum forming a second shell member to shape;
    locating a high density, closed-cell foam within at least one of the first shell member and the second shell member;
    bringing the first shell member and the second shell member into nesting relationship to enclose the foam between the first shell member and the second shell member;
    compressing the first shell member and the second shell member against the foam; and
    bonding the foam to the first member and the second shell member to create an integral structure.

18. The method according to claim 17 wherein:
    the base sheet comprises one of acrylonitrile butadiene styrene (ABS) and
    polyvinyl chloride (PVC); and
    wherein the acrylic film includes a UV protectorant.

19. The method according to claim 17 wherein:
    the cosmetic film is a polymer film having a wood grain or carbon fiber finish look.

20. The method according to claim 17, wherein:
    the cosmetic film is a colored polymer film.

* * * * *